United States Patent
Reutlinger et al.

(10) Patent No.: US 9,601,949 B2
(45) Date of Patent: *Mar. 21, 2017

(54) ELECTRIC MACHINE

(71) Applicant: Robert Bosch GmbH, Stuttgart (DE)

(72) Inventors: Kurt Reutlinger, Stuttgart (DE); Markus Heidrich, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 301 days.

This patent is subject to a terminal disclaimer.

(21) Appl. No.: 14/197,888

(22) Filed: Mar. 5, 2014

(65) Prior Publication Data

US 2014/0184010 A1    Jul. 3, 2014

Related U.S. Application Data

(63) Continuation of application No. 13/061,178, filed as application No. PCT/EP2009/060463 on Aug. 13, 2009, now Pat. No. 8,729,766.

(30) Foreign Application Priority Data

Aug. 27, 2008  (DE) .................. 10 2008 041 606
Apr. 30, 2009  (DE) .................. 10 2009 002 739

(51) Int. Cl.
  *H02K 1/26*   (2006.01)
  *H02K 1/24*   (2006.01)
  (Continued)

(52) U.S. Cl.
  CPC ............ *H02K 1/265* (2013.01); *H02K 1/246* (2013.01); *H02K 1/27* (2013.01); *H02K 3/345* (2013.01);
  (Continued)

(58) Field of Classification Search
  CPC .................................................. H02K 21/021
  (Continued)

(56) References Cited

U.S. PATENT DOCUMENTS 4,147,946 A   4/1979   Linscott, Jr. et al.
4,499,392 A   2/1985   Giacoletto
(Continued)

FOREIGN PATENT DOCUMENTS

JP    61129474      8/1986
JP     9261900     10/1997
JP    2001204150    7/2001

OTHER PUBLICATIONS

International Search Report for Application No. PCT/EP2009/060463 dated Jan. 14, 2011 (5 pages).

*Primary Examiner* — Naishadh Desai
(74) *Attorney, Agent, or Firm* — Michael Best & Friedrich LLP

(57) ABSTRACT

The invention relates to a synchronous machine with hybridenergisation, in particular a generator for supplying the electrical system of a motor vehicle, comprising a laminated stator (16) with a multiphase stator winding (18) and a laminated rotor (20) with an energizer winding (29), which together with permanent magnets (24,25) around the rotor periphery, provides the energisation for the machine. According to the invention, favorable electrical and magnetic properties and an improvement in manufacturing conditions of the machine can be achieved, wherein the grooves (40) for the energiser windings (29) are disproportionately enlarged in relation to the groove base (44) and are preferably bell-shaped.

20 Claims, 4 Drawing Sheets

(51) Int. Cl.
  *H02K 3/34*    (2006.01)
  *H02K 3/487*   (2006.01)
  *H02K 21/04*   (2006.01)
  *H02K 1/27*    (2006.01)
  *H02K 3/30*    (2006.01)
  *H02K 21/16*   (2006.01)

(52) U.S. Cl.
  CPC ............ *H02K 3/487* (2013.01); *H02K 21/042* (2013.01); *H02K 1/276* (2013.01); *H02K 3/30* (2013.01); *H02K 21/16* (2013.01)

(58) Field of Classification Search
  USPC .................... 310/181, 214, 215, 216.069
  See application file for complete search history.

(56) References Cited

U.S. PATENT DOCUMENTS

| | | |
|---|---|---|
| 4,857,788 A | 8/1989 | Hein et al. |
| 5,003,208 A | 3/1991 | Hama et al. |
| 5,157,294 A | 10/1992 | Matsushita |
| 5,296,770 A | 3/1994 | Pflueger et al. |
| 5,663,605 A | 9/1997 | Evans et al. |
| 5,905,322 A | 5/1999 | Tsay |
| 6,037,691 A | 3/2000 | Akemakou |
| 6,072,257 A | 6/2000 | Akemakou |
| 6,271,613 B1 | 8/2001 | Akemakou et al. |
| 7,414,343 B2 | 8/2008 | Arita et al. |
| 8,729,766 B2 * | 5/2014 | Reutlinger ............ H02K 1/246 310/181 |
| 2007/0252468 A1 | 11/2007 | Lee |
| 2008/0174199 A1 | 7/2008 | Ishigami et al. |
| 2010/0207480 A1 | 8/2010 | Reutlinger |

* cited by examiner

ELECTRIC MACHINE

RELATED APPLICATIONS

This application is a continuation of U.S. application Ser. No. 13/061,178, filed Jun. 14, 2011, which is a U.S. 371 National Phase filing of PCT/EP2009/060463, filed Aug. 13, 2009, which claims priority to German Application No. 10 2009 002 739.4, filed Apr. 30, 2009 and German Application No. 10 2008 041 606.1, filed Aug. 27, 2009. The entire contents of all the foregoing are hereby incorporated by reference.

BACKGROUND OF THE INVENTION

The invention is based on an electric machine, such as is described in the older German patent application DE 10 2007 025 971.0. Such a hybrid-excited synchronous machine is suitable, in particular, for supplying the power supply of motor vehicles, wherein said synchronous machine is used in a multi-phase stator winding system in the generator mode with regulated induced voltage, and the poles of the rotor are excited on a permanently magnetic and/or electric basis.

SUMMARY OF THE INVENTION

The electric machine according to the invention has the advantage that as a result of the proposed shaping of the rotor grooves the exciter winding can be embodied without difficulty with a high filling factor and with a short average turn length with a low electrical resistance. Furthermore, the proposed groove geometry makes it possible to optimize the configuration of the rotor in a particularly advantageous way in order to achieve a low electrical and magnetic resistance, in particular when permanent magnets are arranged on the rotor circumference in order to bring about additional permanent magnetic excitation. In addition, it is possible without difficulty to carry out automatic winding of the groove. Furthermore, in this way the rotor winding can very easily be divided into component coils, which can then advantageously be arranged symmetrically on either side of the rotor shaft. This minimizes the imbalance of the rotor.

It is expedient here if the rotor grooves at the groove base rise on both sides toward the groove center, in particular are curved in a circular shape toward the groove opening and are embodied so as to be concentric with respect to the passage opening in the rotor shaft. On the one hand, this facilitates the winding process since the individual runs of the exciter winding enter into all the regions of the groove with low lateral guidance by virtue of the groove cross section which drops away toward the groove corners, and permit a high filling factor. At the same time, the turn length and therefore the electrical resistance of the exciter winding are minimized.

The lateral groove walls are preferably curved toward the groove center, with the result that the grooves are given overall a substantially bell-shaped cross section. In this context, the iron cross section of the rotor along the groove edges can also be adapted in a particularly effective way to the respective size of the magnetic flux, and the magnetic resistance between the core of the rotor and the poles can be reduced.

In particular, in the case of two-pole basic rotor electrical excitation the advantages which can be achieved by means of the proposed shaping of the grooves are particularly striking In this case, the rotor has, at its circumference, only two grooves in which an exciter winding composed of two substantially identical component coils which are arranged symmetrically with respect to the rotor shaft can be accommodated in a particularly advantageous way. Given suitable shaping and dimensioning of the grooves as is emphasized in the subclaims, very favorable conditions are obtained both in terms of fabrication technology and in terms of the electrical and magnetic resistance.

Insulating foils which are introduced into the rotor grooves as electric insulation are secured in a very reliable and enduring fashion by virtue of the fact that the insulating foils are suitably secured to the inner sides of the poles in the region of the groove openings, in particular are fixed in slits on the inner side of the poles. In this context it is expedient if the slits for securing the insulating foils are embodied as undercuts in the poles, preferably as a prolongation of the lateral groove walls. The insulating foils are expediently composed of stiff insulating paper.

BRIEF DESCRIPTION OF THE DRAWINGS

Exemplary embodiments of the invention are illustrated in the drawings which are explained in more detail in the following description.

In the drawings.

DETAILED DESCRIPTION

Figure 1:
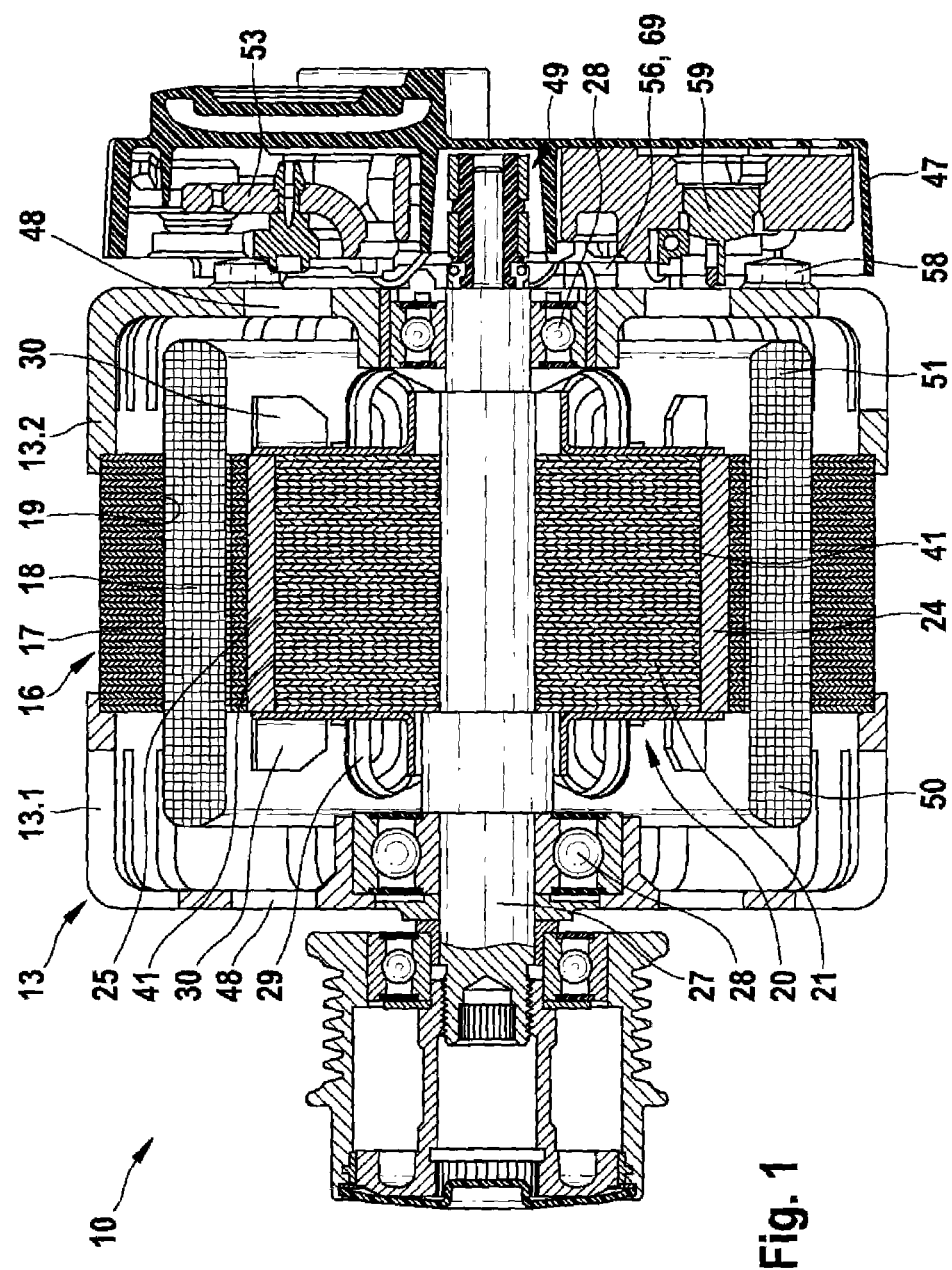
FIG. 1 shows a longitudinal section through an alternating current generator for motor vehicles having a hybrid-excited rotor in an alternating pole arrangement.

FIG. 1 illustrates a section through an electric machine 10 in the embodiment as an alternating current generator for motor vehicles. Said alternating current generator has a two-component housing 13 which is composed of a first end plate 13.1 and a second end plate 13.2. The end plate 13.1 and the end plate 13.2 hold a stator 16, with a circular-ring-shaped laminated stator packet 17, in whose grooves 19 which are open toward the inside and extend axially a stator winding 18 is inserted. The annular stator 16 surrounds, with its radially inwardly directed surface, a rotor 20 which is embodied as a hybrid-excited rotor. The stator 16 interacts here over a working air gap with the rotor 20 which is rotatably mounted in the stator 16.

The rotor 20 has, in a predefined sequence over its circumference, a plurality of north poles N and south poles S which are formed by permanent magnets 24, 25 and by the exciter winding 29. In this context, the pole number of the rotor 20 can be changed as a function of the strength and direction of an exciter current Ie in the exciter winding 29 and by the number of permanent magnets used.

The rotor 20 has a magnetically permeable body which is embodied as a lamination packet 21. The laminated rotor packet is laminated in the axial direction with lamination thickness between 0.1 mm and 2.0 mm. Below 0.1 mm, the resistance of the lamination packet 21 to centrifugal forces is too small. Above 2.0 mm, the reduction in the eddy current losses on the outer surface of the rotor 20 is no longer sufficient, with the result that the permanent magnets 24, 25 which are installed can be damaged or demagnetized.

The axial length of the laminated rotor packet 21 preferably corresponds to the axial length of the circular-ring-shaped laminated stator packet 17, or is longer or shorter than the laminated stator packet 17 for a tolerant compensation of up to 2 mm, and is preferably held together by weld seams. Instead of welds it is possible to use rivets or buttoned connections.

The exciter winding 29 is embodied by way of example as a diameter coil in the case of the two-pole variant, and it is located in grooves 40 which are punched out of the lamination packet 21. The exciter winding 29 can be wound, for example, as a flyer winding (double flyer) directly into the laminated rotor packet 21. Furthermore, areas 41 into which permanent magnets 24, 25 can be inserted are hollowed out in the laminated rotor packet.

According to the invention, the magnets 24, 25 are preferably inserted into punched out areas 41 in the laminated rotor packet. This makes it possible to take up the centrifugal forces which occur during operation, and as a result to ensure that the magnets are reliably held on the rotor. A material with a remanent induction of greater 1 T proves particularly advantageous as the magnet material. In particular permanent magnets made of rare earth material have these magnetic properties. The magnets are installed here in the rotor in such a way that they generate a substantially radial field. This field then enters the laminated stator packet from the rotor across the air gap and induces a voltage in the windings of the stator as the rotor rotates.

The rotor 20 is mounted in the respective end plates 13.1 and 13.2, respectively, in such a way that it can rotate by means of a shaft 27 and a roller bearing 28 on each side of the rotor. Said rotor 20 has two axial end faces, to each of which a fan 30 is attached. These fans are substantially composed of a plate-shaped or disk-shaped section from which fan blades extend in a known fashion. The fans 30 serve to permit air to be exchanged between the outside and the interior of the electric machine 10 via openings 48 in the end plates 13.1 and 13.2. For this purpose, openings 48 are provided at the axial ends of the end plates 13.1 and 13.2, and cooling air is sucked into the interior of the electric machine 10 by means of the fans 30 via said openings 48. This cooling air is accelerated radially outward by the rotation of the fans 30, with the result that said air can pass through the cooling-air-permeable winding heads 50 on the drive side and the cooling-air-permeable winding heads 51 on the electronics side. This effect cools the winding heads 50, 51. After the cooling air has passed through the winding heads 50, 51, or flowed around the winding heads, the cooling air takes a radial path toward the outside through openings (not illustrated).

A protective cap 47, which protects various components against ambient influences, is located on the right-side in FIG. 1. This protective cap 47 closes off a slip ring assembly 49 which supplies the exciter winding 29 with exciter current. Arranged around this slip ring assembly 49 is a heat sink 53, which acts here as a positive heat sink and on which positive diodes 59 are mounted. The end plate 13.2 acts as what is referred to as a negative heat sink. The connecting plate 56, which connects negative diodes 58 and positive diodes 59 attached to the end plate 13.2 to one another in the form of a bridge circuit 69, is arranged between the end plate 13.2 and the heat sink 53.

Figure 2:
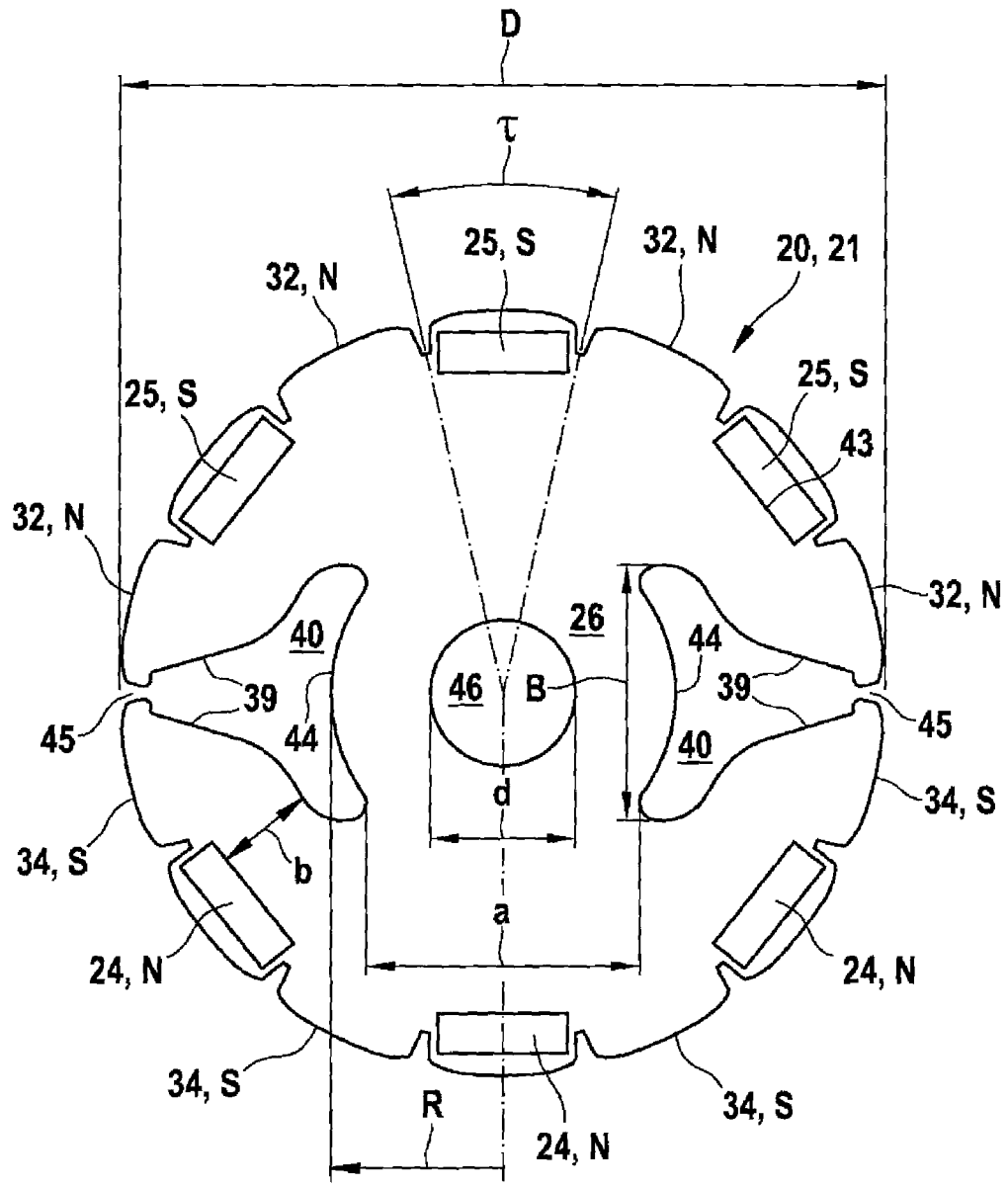
FIG. 2 shows a laminated rotor section for a machine with two-pole electrical excitation, having a total of fourteen poles with six permanently magnetically excited poles.

FIG. 2 shows a laminated rotor section of an electric machine 10 which has a total of 14 poles and has two-pole basic electrical excitation, distributed over four north poles 32 and four south poles 34, as well as having six poles 24 and 25 which are permanently magnetically excited. In the case of electrical excitation, which generates north poles 32 in the upper half of the illustration and the south poles 34 in the lower half, the permanent magnets are respectively magnetized in opposite directions, with the result that they form south poles 25 at the circumference of the rotor 20 in the upper half, and north poles 24 in the lower half. The permanent magnets 24 and 25 are held in pockets 43 which are punched out from the laminated rotor packet 21 between the electrically excited poles 32, 34. The permanent magnets are securely held in the pockets, in particular against the strong centrifugal forces during the operation of the machine.

In order to obtain a high power density of the machine, preferably rare earth magnets are used as permanent magnets 24 and 25. When there are relatively small demands made of the power density of the machine, it is instead also possible to use ferrite magnets as permanent magnets. In terms of the pole number of the machine, alternatives are possible, and in the case of two-pole electrical excitation it is, in particular, also possible to equip the machine alternately with four or eight permanent magnets between electrically excited poles, as a result of which the overall pole number of the machine correspondingly changes.

The laminated rotor section illustrated in FIG. 2 has two bell-shaped grooves 40 which are disproportionately enlarged in relation to the groove base 44 to a width B which is larger than the diameter d of the rotor shaft 27, or of an opening 45 for the rotor shaft to pass through. The largest width B of the grooves 40 is oriented according to the rotor diameter D and is at maximum 40% of the rotor diameter. This configuration of the grooves makes it easily possible to divide the exciter winding into two component coils which can be arranged symmetrically in the winding heads 50, 51, distributed evenly on both sides of the rotor shaft 27 with a minimized winding head length and correspondingly reduced electrical resistance. A range of between 20% and 45% of the rotor diameter D has proven advantageous here as the minimum distance a between two exciter grooves 40 in the rotor core 26. With such dimensioning of the rotor iron at this narrow point, a sufficient cross section for the magnetic flow is ensured.

The grooves 40 of the rotor 20 are also configured in such a way that the groove base 44 rises on both sides toward the groove center, preferably with a circular curvature, with the result that the groove base 44 extends concentrically with respect to the passage opening 46 for the rotor shaft 27. The radius R of the groove base is to be in the range between twice and four times the radius d/2 of the rotor shaft 27 here in order also to ensure a constant and sufficient magnetic cross section in the rotor core 26.

The bell shape of the grooves 40 is also characterized in that the lateral groove walls 39 are curved toward the groove center, with the result that in this area a sufficient iron cross section is also available for the magnetic flux to the electrically excited poles 32 and 34 which are located directly to the side of the grooves. A further characteristic variable in this area of the rotor iron is here the edge distance b to the side of the exciter grooves 40 from the adjacent edge of the permanent magnets 24 and 25 arranged there. In order to ensure a sufficient cross section between the corners of the permanent magnets 24, 25 and the adjacent groove edges, the lateral distance b is to be between 25% and 100% of the pole pitch τ of the electrically or permanently magnetically excited rotor pole.

Figure 3:
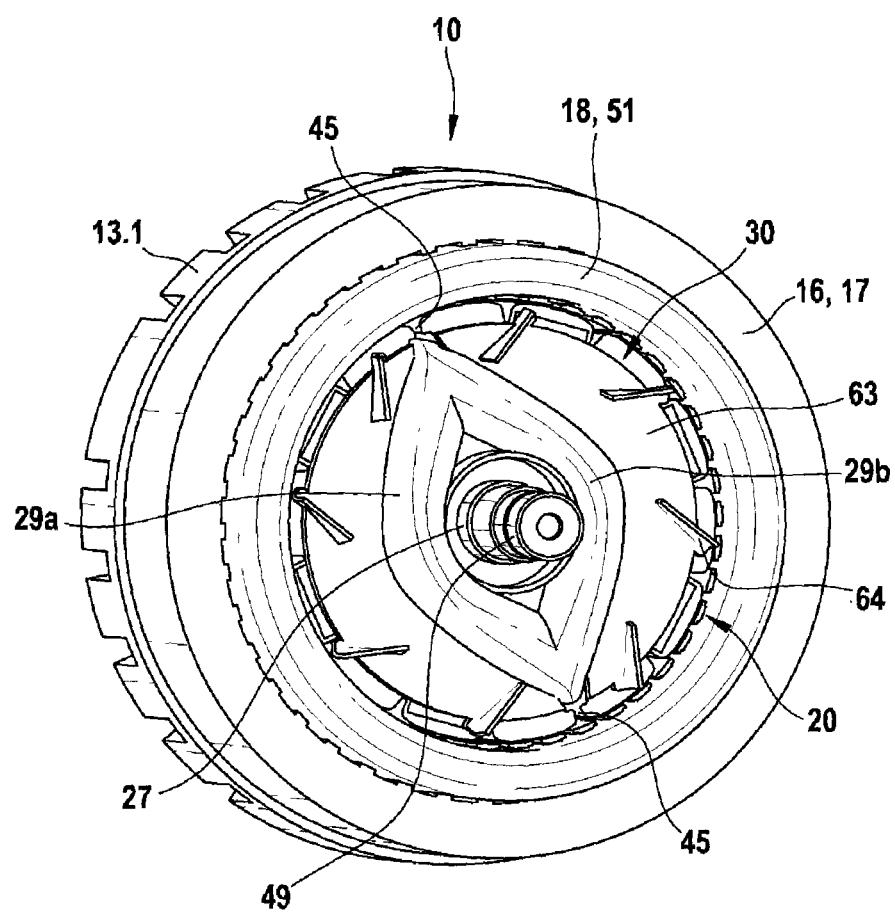
FIG. 3 shows a perspective illustration of an inventive machine with two-pole electrical excitation and having two component coils which are arranged symmetrically with respect to the rotor shaft, with the end plate removed.

FIG. 3 shows a perspective illustration of a synchronizing machine according to the invention of the bearing cover 13.2 removed. The machine has two-pole basic electrical excitation, wherein the exciter winding 29 is divided into two substantially identical component coils 29a and 29b which engage around the rotor shaft 27 on both sides and are arranged symmetrically with respect thereto. The laminated packet 17 of the rotor 20 corresponds here to the lamination section which is shown in FIG. 2 and has bell-shaped grooves, only the groove openings 45 of which can be seen. The winding heads of the two component coils 29a and 29b of the exciter winding engage over a base plate 63 in the fan 30. The exciter winding 29 completely fills the grooves 40 here and is configured in such a way that the ratio of the copper mass $m_N$ in the exciter grooves 40 with respect to the copper mass $m_w$ of the winding heads is 0.4 to 2.5, preferably 0.5 to 1. The mass ratio of the winding parts in the grooves, or in the winding heads, corresponds to the respective wire lengths and constitutes, in the specified ratio, an advantageous compromise in terms of the shaping of the exciter winding 29 and of the stator winding 18, wherein the given ratio of the copper mass in the grooves, or in the winding heads, is larger in the case of the stator than in the case of the rotor. FIG. 3 shows of the stator 16 only the winding head of the stator winding 18 and its lamination packet 17, which is seated, according to the illustration in FIG. 1, in the end plate 13.1 of the two-part housing 13. The described and illustrated shape of the hybrid excited rotor 20 of the machine according to the invention forms here an advantageous compromise in terms of the requirements with respect to strength, guidance of flux, fabrication methods and short winding head connections.

Figure 4:
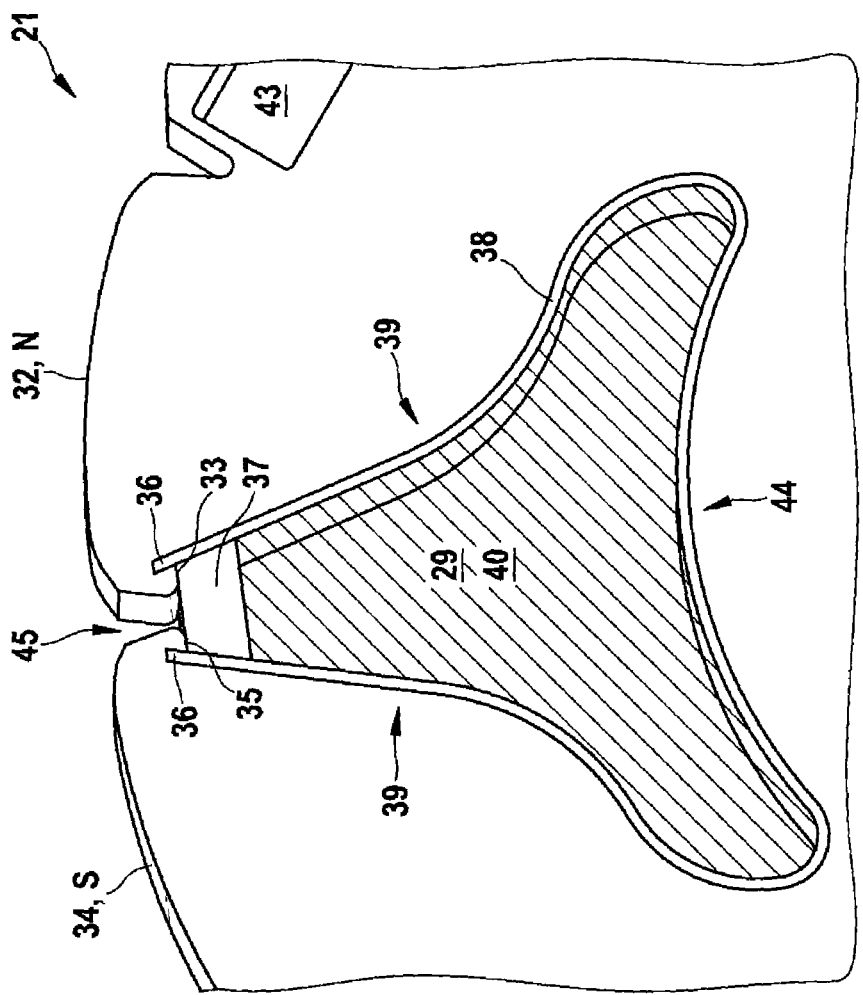
FIG. 4 shows a component section through the rotor of the alternating current generator according to the invention with an illustration of the groove insulation.

FIG. 4 shows a perspective illustration of part of the lamination packet 21 of the rotor 20 with a groove 40, such as has already been previously described in detail in particular with respect to FIG. 2. Identical reference signs are used for identical parts here.

The exciter winding 29 is illustrated in FIG. 4 only as hatching. It is insulated from the laminations of the laminated rotor packet 21 by means of foil 38 which is preferably composed of insulating paper. The insulating foil 38 is supported in the region of the groove openings 45 on the inner sides 33, 35 of the poles 32, 34 and is secured therein the slits 36 which are formed as undercuts in the poles 32, 34 and extend as a prolongation of the lateral groove walls 39. This method of securing the groove insulation in undercut-like slits 36 can basically also be used for other groove shapes than for the illustrated bell-shaped groove. However, in this groove shape the advantage of the proposed securing means for the groove insulation is particularly pronounced since the insulating foil has a tendency, owing to the groove shape, to move out in the region of the groove opening toward the interior of the groove, as a result of which the insertion of the exciter winding 29 could be disrupted.

Furthermore, in the region of the groove openings 45 it is possible to insert groove wedges 37 which improve the insulation of the winding on the inner sides 33, 35 of the poles 32, 34, to secure the insulating foil 38 in its position and to support the exciter winding 29 in withstanding large centrifugal forces.

The invention claimed is:
1. An electric machine, comprising:
a laminated stator (16) with a multi-phase stator winding (18); and
a laminated rotor (20) with an exciter winding (29) which is arranged in grooves (40) on the rotor circumference and which supplies the excitation of the machine,
characterized in that the rotor grooves (40) include respective groove openings (45) and groove bases (44) wherein the grooves widen in the direction from the openings (45) to the bases (44), and
characterized in that the rotor (20) has two-pole electrical excitation and has exactly two grooves (40) on its circumference, in which grooves (40) the exciter winding (29) which is composed of two component coils (29a, b) which are arranged substantially symmetrically with respect to a rotor shaft (27) is located.

2. The electric machine as claimed in claim 1, characterized in that the groove base (44) rises on both sides toward a groove center.

3. The electric machine as claimed in claim 1, characterized in that the groove base (44) is curved toward the groove opening (45).

4. The electric machine as claimed in claim 1, characterized in that the groove base (44) is curved in a circular shape and is concentric with respect to a passage opening (46) in a rotor shaft (27).

5. The electric machine as claimed in claim 1, characterized in that lateral groove walls (39) are curved toward a groove center.

6. The electric machine as claimed in claim 1, characterized in that an iron cross section of the rotor (20) along lateral groove walls (39) is substantially adapted to the respective size of the magnetic flux.

7. The electric machine as claimed in claim 1, characterized in that the grooves (40) are configured substantially in the shape of a bell.

8. The electric machine as claimed in claim 1, characterized in that the rotor (20) has, in addition to electric excitation means, four, six or eight permanent magnets (24, 25) on its circumference.

9. The electric machine as claimed in claim 1, characterized in that a groove width (B) at the base (44) is larger than a diameter (d) of the rotor shaft (27) and smaller than 40% of a diameter (D) of the rotor.

10. The electric machine as claimed in claim 1, characterized in that a minimum distance (a) between two exciter grooves (40) in a rotor core (26) is in the range between 20% and 45% of a diameter (D) of the rotor.

11. The electric machine as claimed in claim 1, characterized in that the groove base (44) curves in a circular shape, with a radius (R) in the range between twice and four times a radius (d/2) of the rotor shaft (27).

12. The electric machine as claimed in claim 1, also comprising permanent magnets (24, 25) on a circumference of the rotor, characterized in that a lateral distance (b) between a groove (40) and an adjacent edge of a permanent magnet (24, 25) is in the range between 25% and 100% of a pole pitch (τ) of a rotor pole (24, 25; 32, 34).

13. The electric machine as claimed in claim 1, characterized in that the ratio of a copper mass ($m_N$) of the windings in the rotor grooves (40) to a copper mass ($m_w$) of winding heads (50, 51) is 0.4 to 2.5.

14. The electric machine as claimed in claim 1, characterized in that insulating foils (38) are inserted into the rotor grooves (40), which insulating foils (38) are secured to inner sides (33, 35) of poles (32, 34) in the region of groove openings (45).

15. The electric machine as claimed in claim 14, characterized in that the insulating foils (38) are secured in slits (36) on the inner sides (33, 35) of the poles (32, 34) in the region of the groove openings (45).

16. The electric machine as claimed in claim 15, characterized in that the slits (36) secure insulating foils (38) as undercuts in the poles (32, 34) to the side of the groove openings (45).

17. The electric machine as claimed in claim 15, characterized in that the slits (36) for securing the insulating films (38) extend as a prolongation of the lateral groove walls (39).

18. The electric machine as claimed in claim 14, characterized in that the insulating foils (38) are composed of insulating paper.

19. The electric machine as claimed in claim 14, characterized in that the grooves (40) are closed off by groove wedges (37).

20. An electric machine, comprising:
a laminated stator (16) with a multi-phase stator winding (18); and
a laminated rotor (20) with an exciter winding (29) which is arranged in grooves (40) on the rotor circumference and which supplies the excitation of the machine,
characterized in that the rotor grooves (40) include respective groove openings (45) and groove bases (44) wherein the grooves widen in the direction from the openings (45) to the bases (44),
characterized in that the rotor (20) has two-pole electrical excitation and has two grooves (40) on its circumference, in which grooves (40) the exciter winding (29) which is composed of two component coils (29a, b) which are arranged substantially symmetrically with respect to a rotor shaft (27) is located, and
characterized in that a groove width (B) at the base (44) is larger than a diameter (d) of the rotor shaft (27).

* * * * *